United States Patent
Murakami et al.

(10) Patent No.: US 6,281,599 B1
(45) Date of Patent: Aug. 28, 2001

(54) REMOTE CONTROL APPARATUS (75) Inventors: Yuichi Murakami, Chiryu; Koji Aoki, Nagoya; Rikuo Hatano; Hiroki Okada, both of Toyota, all of (JP)

(73) Assignees: Aisin Seiki Kabushiki Kaisha; Jidosha Kabushki Kaisha, both of Aichi-ken (JP)

( * ) Notice: Subject to any disclaimer, the term of this patent is extended or adjusted under 35 U.S.C. 154(b) by 0 days.

(21) Appl. No.: 09/345,838

(22) Filed: Jul. 1, 1999

(30) Foreign Application Priority Data

Jul. 6, 1998 (JP) .................................................. 10-190429

(51) Int. Cl.$^7$ .................................................. B60R 25/00
(52) U.S. Cl. ........................ 307/10.2; 180/287; 340/539; 340/825.72
(58) Field of Search ................................. 307/10.2, 10.3, 307/10.5; 180/287; 340/420, 539, 541, 825.72, 825.69, 825.31

(56) References Cited

U.S. PATENT DOCUMENTS

| | | | |
|---|---|---|---|
| 4,884,055 | * 11/1989 | Memmola | 340/426 |
| 5,252,965 | 10/1993 | Gidwani et al. | |
| 5,276,728 | * 1/1994 | Pagliaroli et al. | 307/10.3 |
| 5,541,585 | * 7/1996 | Duhame et al. | 340/541 |
| 5,973,611 | * 10/1999 | Kulha et al. | 340/825.31 |

FOREIGN PATENT DOCUMENTS

| | | |
|---|---|---|
| 5-71257 | 3/1993 | (JP) . |
| 05106376 | 4/1993 | (JP) . |
| 05156851 | 6/1993 | (JP) . |
| 07150835 | 6/1995 | (JP) . |

* cited by examiner

Primary Examiner—Albert W. Paladini
(74) Attorney, Agent, or Firm—Sughrue, Mion, Zinn, Macpeak & Seas, PLLC (57) ABSTRACT A remote control apparatus comprises a vehicle-mounted unit including a transmitter (26, 28, 23) for transmitting an ID request, a receiver (32, 33) for receiving a reply ID transmitted in response to the ID request, controller (31) for controlling the operation state of equipment (40, 60) depending on whether the receiver (32, 33) receives the ID, as well as a portable unit (10) for transmitting a reply ID in response to the ID request. When a hand sensor (1) provided in a door handle of a vehicle senses no hand and the receiver (32, 33) receives an ID, the controller (31) decreases the transmission power of the ID request. The hand sensor (1) comprises a slot antenna having an outside door handle, the surface of which is formed of a conductive material, a slit formed in the conductive material, and feeding points. The antenna is used for transmission of the ID request.

10 Claims, 13 Drawing Sheets

Fig. 8

REMOTE CONTROL APPARATUS

FIELD OF THE INVENTION

The present invention relates to a remote control apparatus which effects changeover between different operation states of equipment, such as locked and unlocked states of a vehicle door, when a user carrying a portable unit approaches to or moves away from the door.

BACKGROUND OF THE INVENTION

A remote control apparatus of the above-described type suitable for locking and unlocking a vehicle door is called a keyless entry system or a smart entry system. For example, Japanese Patent Application Laid-Open No. 5-106376 discloses a system comprising a portable radio unit and a vehicle-mounted radio unit. The portable radio unit includes first transmission means which transmits a reply signal or response signal when first reception means receives a transmission request signal or call signal. The vehicle-mounted radio unit includes second transmission means for transmitting the call signal at predetermined intervals, and control means which outputs a signal for unlocking doors of a vehicle when second reception means receives the response signal and outputs a signal for locking doors of a vehicle after passage of a predetermined period of time during which the response signal is not received. When a driver carrying the portable radio unit approaches to the vehicle in order to enter the vehicle, the driver-side door is automatically unlocked, and when the driver exits and moves away from the vehicle, the door is automatically locked.

When the driver is outside the vehicle, the second transmission means transmits the call signal. That is, the call signal is transmitted when the engine of the vehicle is stopped. Accordingly, the transmission of the call signal imposes a load on a power source (battery) onboard the vehicle, so that battery electrical power is consumed. If the transmission interval of the call signal is increased in order to reduce power consumption and the communicable distance is relatively short, there arises a problem that the driver carrying the portable radio unit reaches the driver-side door from an incommunicable position during a period between transmission of a call signal and transmission of a next call signal, with the result that the door is not opened even though the driver attempts to open the door. This problem can be mitigated if the transmission power of the call signal is increased in order to increase the communicable distance. In this case, since the amount of consumed power per transmission of the call signal increases, this method is not suitable for reduction of battery power consumption. Accordingly, the transmission interval of the call signal cannot be simply increased.

SUMMARY OF THE INVENTION

A first object of the present invention is to provide a remote control apparatus which can reduce power consumption resulting from repeated transmission of a transmission request signal.

In accordance with the invention, a controller outputs a transmission request signal to a portable unit via an object sensor. The object sensor outputs to the controller a signal indicting whether or not an object, such as a human hand, is present. The controller reduces the transmission power of the transmission request signal when the object sensor senses no object and a receiver receives a reply signal which is transmitted by the portable unit in response to the transmission request signal. The controller unlocks a door after reception of a predetermined ID code from the portable unit and when the object sensor detects the presence of the object. Since the transmission power of the transmission request signal is reduced when the receiver receives a reply signal, electrical power required for transmission can be reduced. The door is unlocked when the portable unit that transmits a reply signal representing the predetermined identification code approaches the receiver, and the sensor senses the human hand. Thus, a person carrying the portable unit can open the door.

Preferably, the controller transmits the transmission request signal with high transmission power at predetermined interval t1 when the receiver receives no reply signal, stops transmission of the transmission request signal when the receiver receives a reply signal, subsequently waits up to a predetermined period t2 until the object sensor detects an object, and transmits the transmission request signal with low transmission power at predetermined intervals t4 when a predetermined period t2 has elapsed during which the object sensor senses no object. Therefore, electrical power required for transmission can be conserved. When the object sensor does not sense an object even after the predetermined period t2 has elapsed, the controller resumes transmission of the transmission request signal. However, since the transmission power is low, the power consumption is low. Although the transmission power is low, communications between the controller, the portable unit, and the receiver can be performed properly, because the portable unit is located in the vicinity of the receiver.

Preferably, the apparatus of the invention further comprises an open/close sensor for generating a signal indicating an open/close state of the door. The controller opens a door window when, after unlocking the door, the object sensor continuously detects an object and the open/close sensor continuously outputs a door close signal for a predetermined period t6.

By virtue of the above-described structure, after the door is unlocked, the window of the door is opened when the predetermined period t6 has elapsed without the door being opened even though the object sensor detects an object. That is, the window of the door is opened when a person carrying the portable unit remains within a sensing area of the object sensor for the period t6 or longer.

Preferably, the controller locks the door when, after the door is unlocked, the object sensor does not detect an object and the open/close sensor continuously outputs a door close signal for a predetermined period t5.

By virtue of the above-described structure, the door is automatically brought back to the locked state when the door is not opened after the door is unlocked, and the object sensor comes into an object-undetected state. Therefore, automatic locking can be performed with improved reliability when a person carrying the portable unit does not open the door.

Preferably, the object sensor comprises a slot antenna having an outside door handle, at least the surface of which is formed of a conductive material, a slit formed in the conductive material, and feeding points provided on the conductive material; and the transmitter supplies the feeding points with a radio wave transmission voltage.

In this case, since the outside door handle itself is used as a conductive plate of the slot antenna, only the slit and the feeding points are required to be added to obtain an antenna function. Therefore, the number of parts required for radiation of radio waves is small. Since the outside door handle has a finite size and does not have a completely flat surface, the slot antenna is considerably different from an ideal slot antenna, so that the performance of the slot antenna is considerably low as compared with an ideal performance. However, effective radio waves are radiated within a small area in the vicinity of the door. The number of parts and the number of steps of assembly for providing an antenna are small, and the antenna can be disposed (or formed) in the outside door handle even though the interior or the surface of the outside door handle is metal (conductive material). In addition, since the antenna is inconspicuous, other persons cannot find the antenna.

Preferably, the object sensor comprises changeover switch for changing the transmission output between a high-power output (i.e., high gain) and a low-power output (i.e., low gain). The changeover switch increases and decreases the transmission power of the transmission request signal.

BRIEF DESCRIPTION OF THE DRAWINGS

Other objects and features of the present invention will be readily appreciated as the same becomes better understood by reference to the following detailed description of the preferred embodiments when considered in connection with the accompanying drawings, in which:

FIG. 2a is a block diagram showing the structure of an object sensor shown in FIG. 1a;

FIG. 2b is a block diagram showing the structure of a sensing circuit shown in FIG. 2a;

FIG. 4a is a front view of a door handle equipped with an antenna shown in FIG. 1a;

FIG. 4b is a cross-sectional view taken along line IVB—IVB in FIG. 4a;

DESCRIPTION OF THE PREFERRED EMBODIMENTS

Figure 1A:
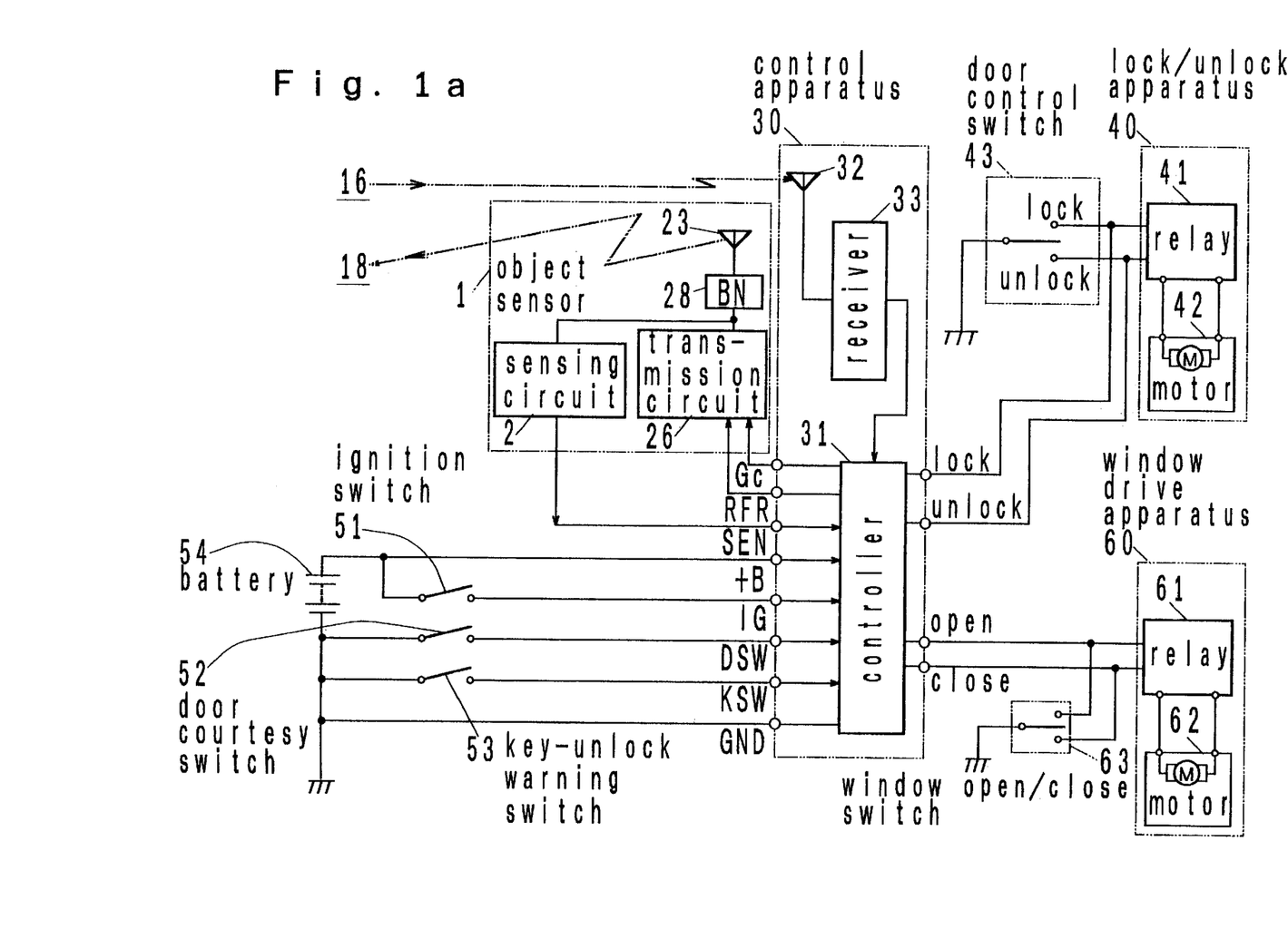
FIG. 1a is a block diagram showing the structure of an on-vehicle unit.

FIG. 1a shows the structure of a first embodiment of the present invention. A control apparatus 30 for locking and unlocking a driver-side door of a vehicle and for opening the window of the driver-side door comprises a controller 31, which includes a CPU and an input/output interface (input/output electric circuit). Electricity is supplied to the controller 31 from a battery 54 of the vehicle. The controller 31 receives a signal IG from an ignition switch 51, a signal DSW from a door courtesy switch 52 for detecting an open state of the door, and a signal KSW from a key-unlock warning switch 53 for detecting whether an engine key is inserted in a key cylinder.

The controller 31 outputs a transmission request signal to a portable unit 10 via an object sensor 1. That is, when the controller 31 supplies a transmission command RFR to a transmission circuit 26, the transmission circuit 26 transmits a request signal from an antenna 23 via a feeder balun 28. In the object sensor 1, the output of the transmission circuit 26 is also supplied to a sensing circuit 2. The sensing circuit 2 outputs to the controller 31 a signal SEN indicating whether or not an object, such as a human hand, is present. Further, a binary signal representing an ID code that has been received by an antenna 32 and demodulated by a receiver 33 is input to the controller 31.

A driver-side door lock/unlock apparatus 40 includes a lock/unlock drive motor 42 and a relay circuit 41 for supplying electricity to the motor 42 in a forward or reverse direction for a lock or unlock operation. A door control switch 43 for instructing the lock or unlock operation is connected to the relay circuit 41 and outputs a lock or unlock command signal to the relay circuit 41 via command signal lines. The controller 31 also outputs a lock or unlock command signal to the command signal lines.

A driver-side window drive apparatus 60 includes a window open/close drive motor 62 and a relay circuit 61 for supplying electricity to the motor 62 in a forward or reverse direction for an opening or closing operation. A window open/close switch 63 for instructing opening or closing of the window is connected to the relay circuit 61 and outputs a window open or close command signal to the relay circuit 61 via command signal lines. The controller 31 also outputs a window open or close command signal to the command signal lines.

Figure 1B:
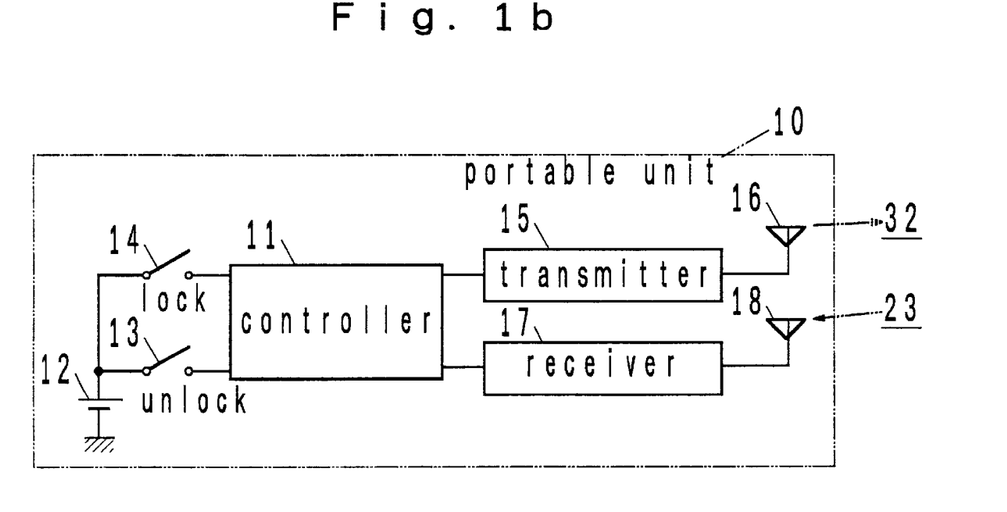
FIG. 1b is a block diagram showing the structure of a portable unit used for unlocking a door of a vehicle on which the unit of FIG. 1a is mounted.

The controller 31 detects receipt of a signal from the portable unit 10 shown in FIG. 1b and brings the lock/unlock apparatus 40 into a locked state or an unlocked state, based on whether a received ID code is a predetermined code registered in the controller 31 and whether the output signal SEN of the sensing circuit 2 of the objector sensor 1 represents presence of an object. The controller 31 outputs a window open command signal to the window drive apparatus 60 when predetermined conditions are satisfied.

Figure 2A:
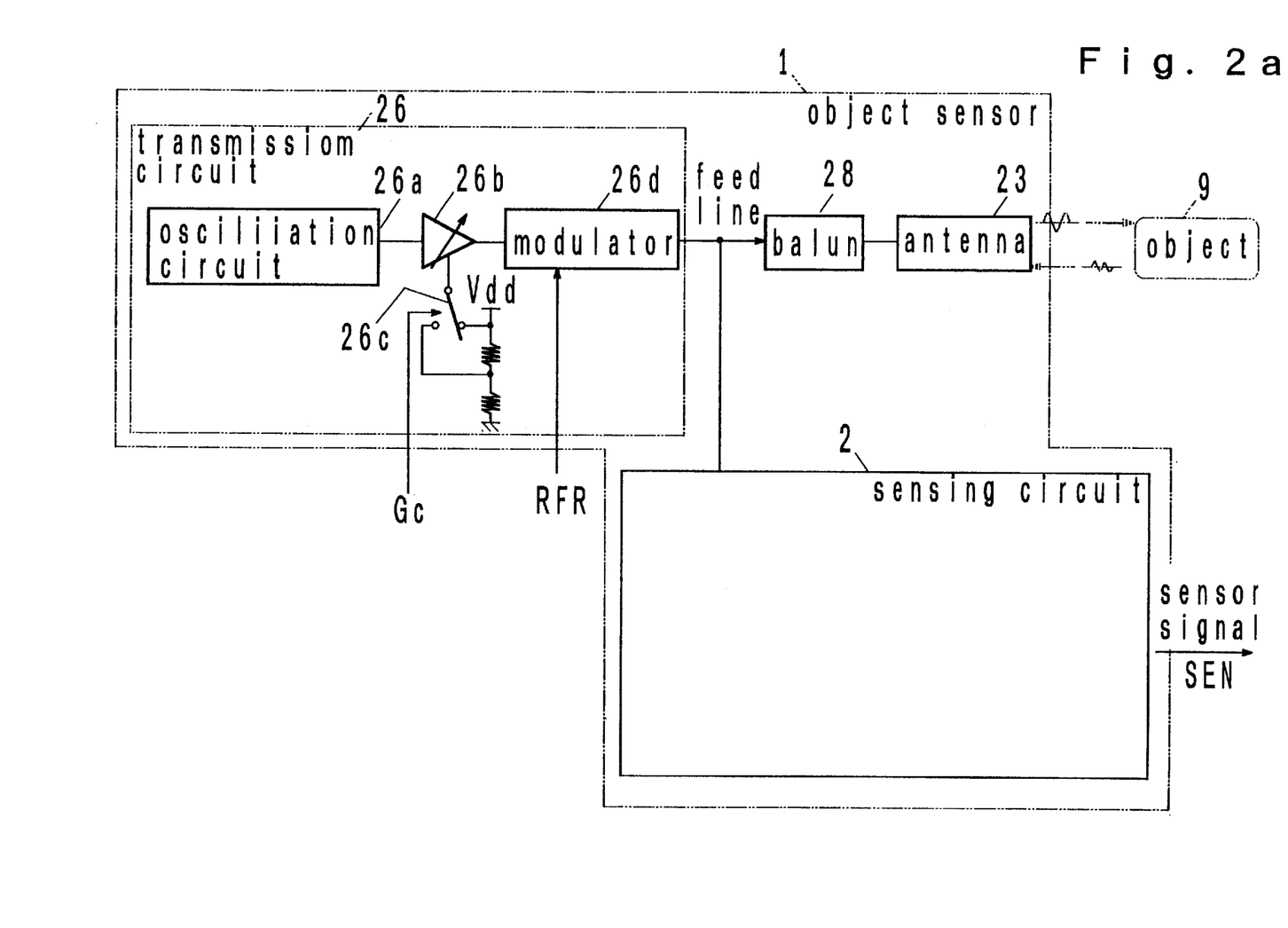

FIG. 2a shows the structure of the transmission circuit 26 of the object sensor 1. The transmission circuit 26 comprises an oscillation circuit 26a that oscillates at a constant frequency, a variable gain amplifier 26b for amplifying an output signal from the oscillation circuit 26a at a high or low gain as designated, an analog electronic switch 26c for effecting changeover between two biases for designating different gains, and a modulator 26d composed of an electronic switching circuit for turning the output of the amplifier 26b ON and OFF. The controller 31 outputs to the analog electronic switch 26c a two-level signal Gc for designating a gain. When the two-level signal Gc is high, a low gain is designated, and when the two-level signal Gc is low, a high gain is designated. The controller 31 outputs to the modulator 26d request data RFR (bit series) for requesting transmission of an ID code. That is, in the present embodiment, the high-frequency signal generated by the oscillation circuit 26a is subjected to on/off modulation (ASK (Amplitude Shift Keying) modulation) to thereby transmit the request data RFR. The high frequency signal that has been ASK-modulated in accordance with the request data RFR and has been sent to the feed line is output to the antenna 23 via the balun 28, which establishes optimal impedance matching with the antenna 23 (50Ω in this case). The sensing circuit 2 is connected to the feed line.

Figure 2B:
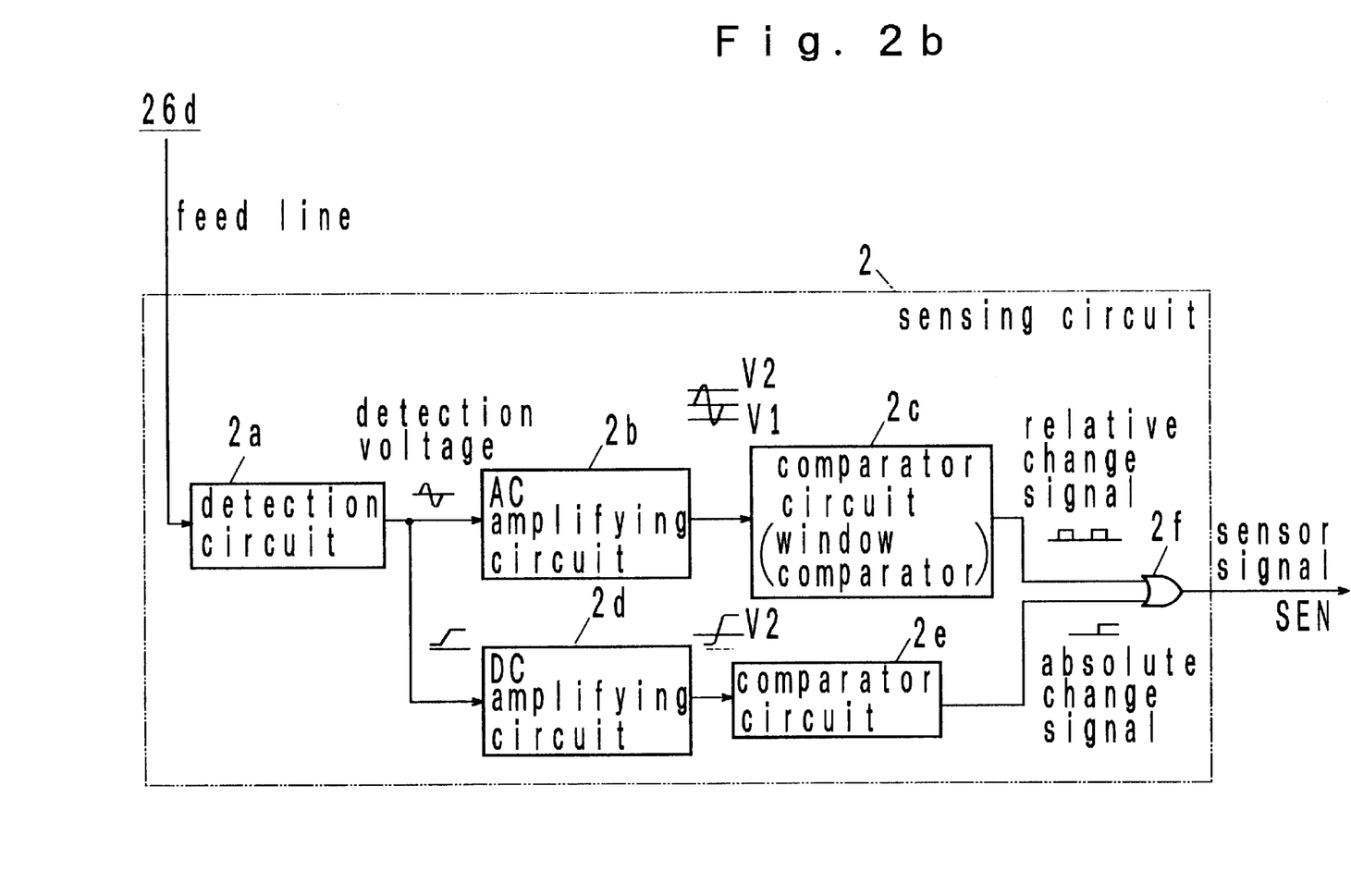
Figure 3:
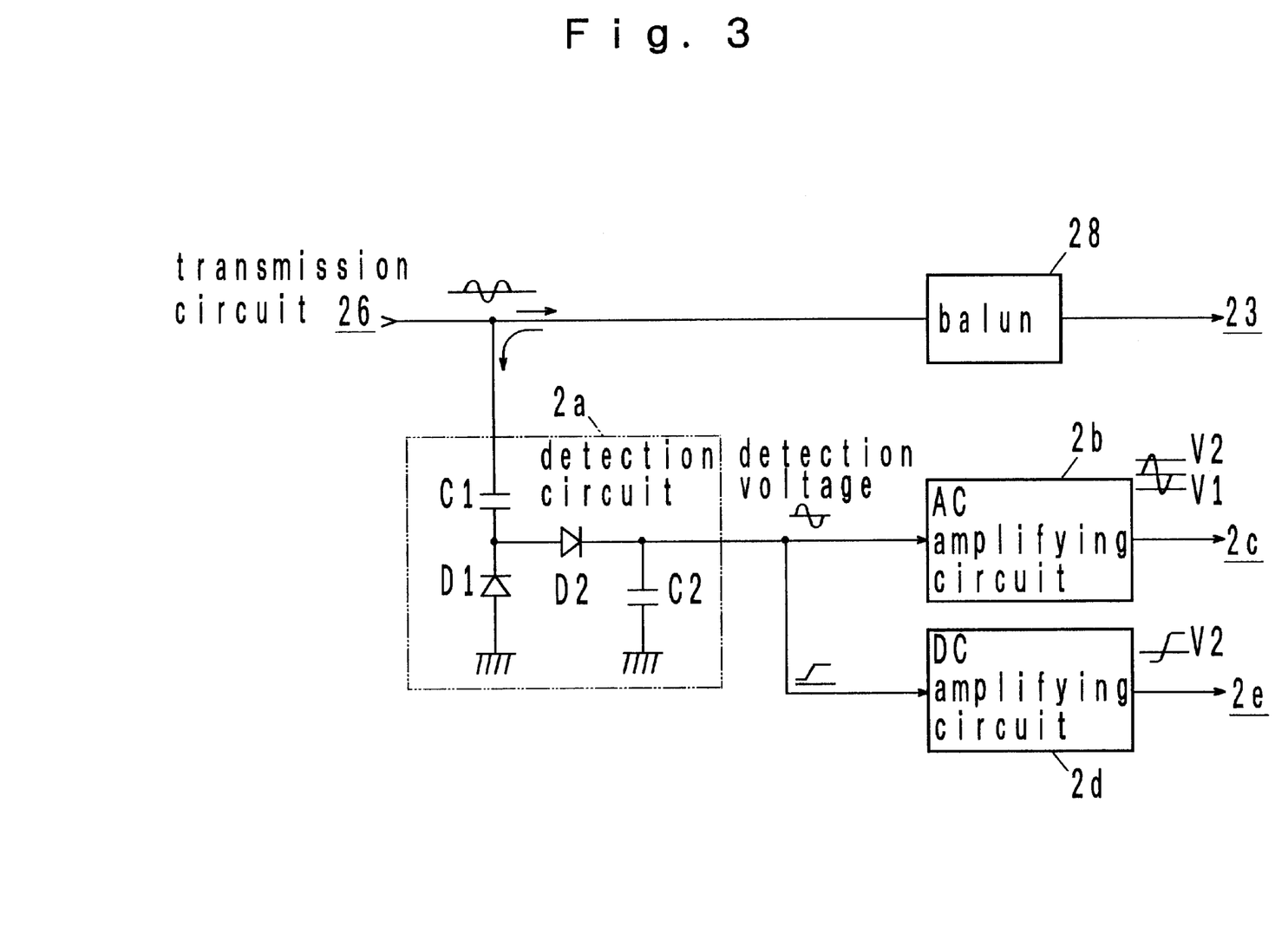
FIG. 3 is an electrical circuit diagram showing the structure of a detection circuit shown in FIG. 2b.

FIG. 2b shows the structure of the sensing circuit 2 of the object sensor 1, and FIG. 3 shows the structure of a detection circuit 2a of the sensing circuit 2. As shown in FIGS. 2b and 3, the sensing circuit 2 comprises the detection circuit 2a, an AC amplifying circuit 2b, a comparator circuit 2c, a DC amplifying circuit 2d, a comparator circuit 2e, and an OR gate 2f. The AC amplifying circuit 2b amplifies an AC component of a detection voltage. The comparator circuit 2c outputs a relative change signal that attains a high level H when the output of the AC amplifying circuit 2b deviates from a predetermined voltage range (predetermined voltage V1 to V2, which is higher than V1). The DC amplifying circuit 2d amplifies a DC component of the detection voltage. The comparator circuit 2e outputs an absolute change signal which attains a high level H when the output of the DC amplifying circuit 2d exceeds the predetermined voltage V2. The OR gate 2f outputs a sensor signal SEN that attains a high level H when either the relative change signal output from the comparator 2c or the absolute change signal output from the comparator 2e attains a high level H. Attainment of the high level H by the sensor signal SEN of the OR gate 2f indicates that an object such as a human hand 9 is in contact with or in proximity to the antenna 23.

The oscillation circuit 26a shown in FIG. 2a oscillates at a constant frequency (in the present embodiment, at 2.45 GHz). When the variable gain amplifier 26b is set to a low gain, and the modulator 26d is in an ON state, the oscillating signal is fed to the antenna 23 such that the impedance is adjusted to 50Ω for matching with the antenna 23. When a dielectric object 9 such as a hand of a person is present in the vicinity of the antenna 23, the input impedance of the antenna 23 changes, with the result that the above-described matched state is cancelled and an unmatched state is created. Consequently, when the object 9 approaches to the antenna 23, the voltage standing wave in the feed line changes, so that the voltage in the feed line increases by a certain amount.

That is, when the object 9 is in proximity to the antenna 23, a radio wave radiated from the antenna 23 reflects on the object 9 and is received by the antenna 23, so that interference arises in the feed line between the transmitted signal and the received signal. While the object 9 is moving the degree of the interference changes in accordance with the speed of approach. An interference wave is detected by the detection circuit 2a, and an AC component of the detection voltage is amplified in order to produce a relative change signal that corresponds to the relative speed of the object 9 with respect to the antenna 23. Further, a DC component of the detection voltage is amplified in order to produce an absolute change signal that corresponds to a position of the object 9 in relation to the antenna 23. That is, the AC component of the detection voltage represents a relative change that corresponds to a speed of approach of the object 9 to the antenna 23; i.e., variation in voltage due to the Doppler effect, and the DC component of the detection voltage represents the distance between the object 9 and the antenna 23. Sensing of the object 9 based on the AC component of the detection voltage becomes possible earlier than does sensing of the object 9 based on the DC component of the detection voltage.

Figure 4A:
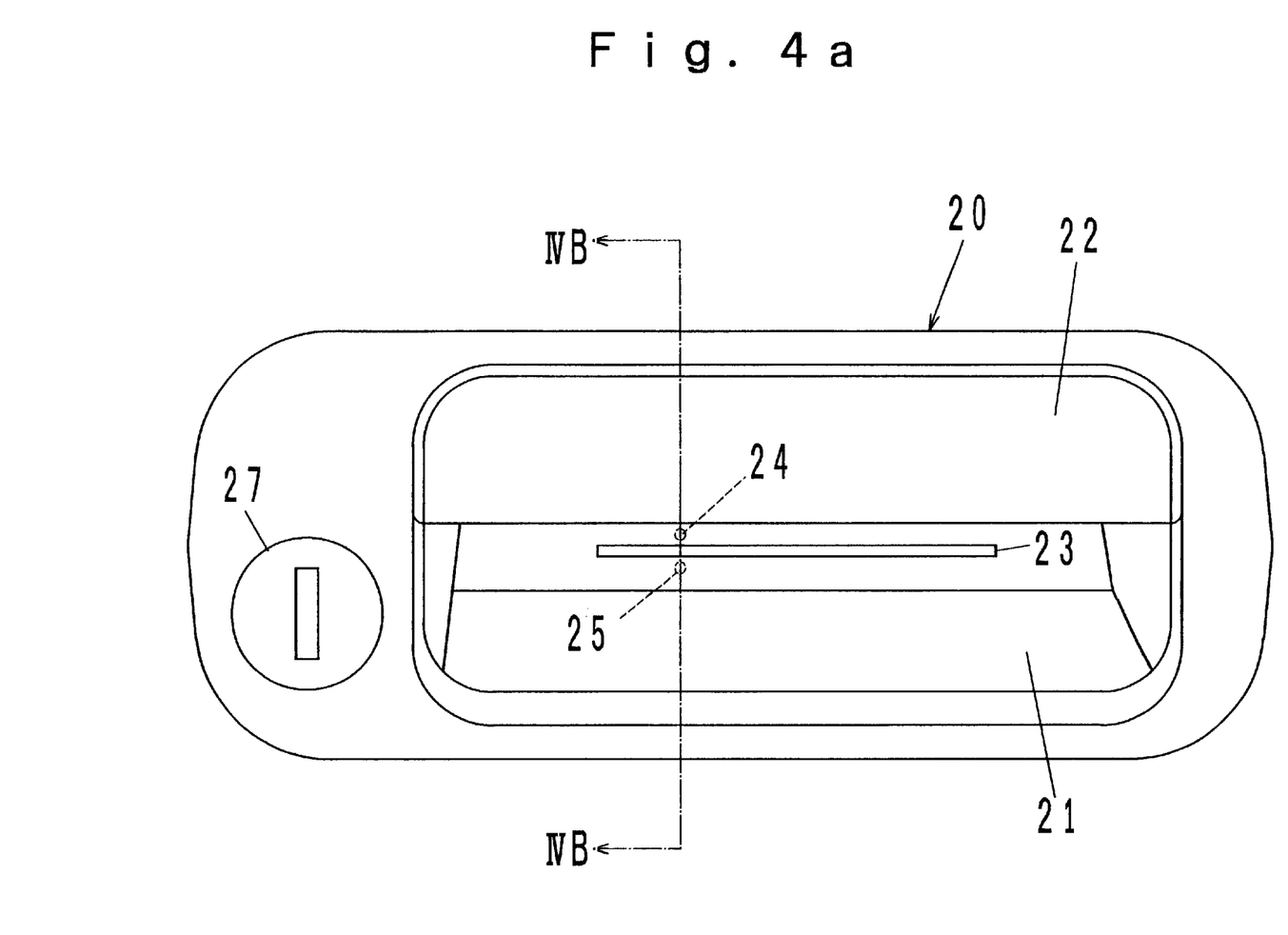
Figure 4B:
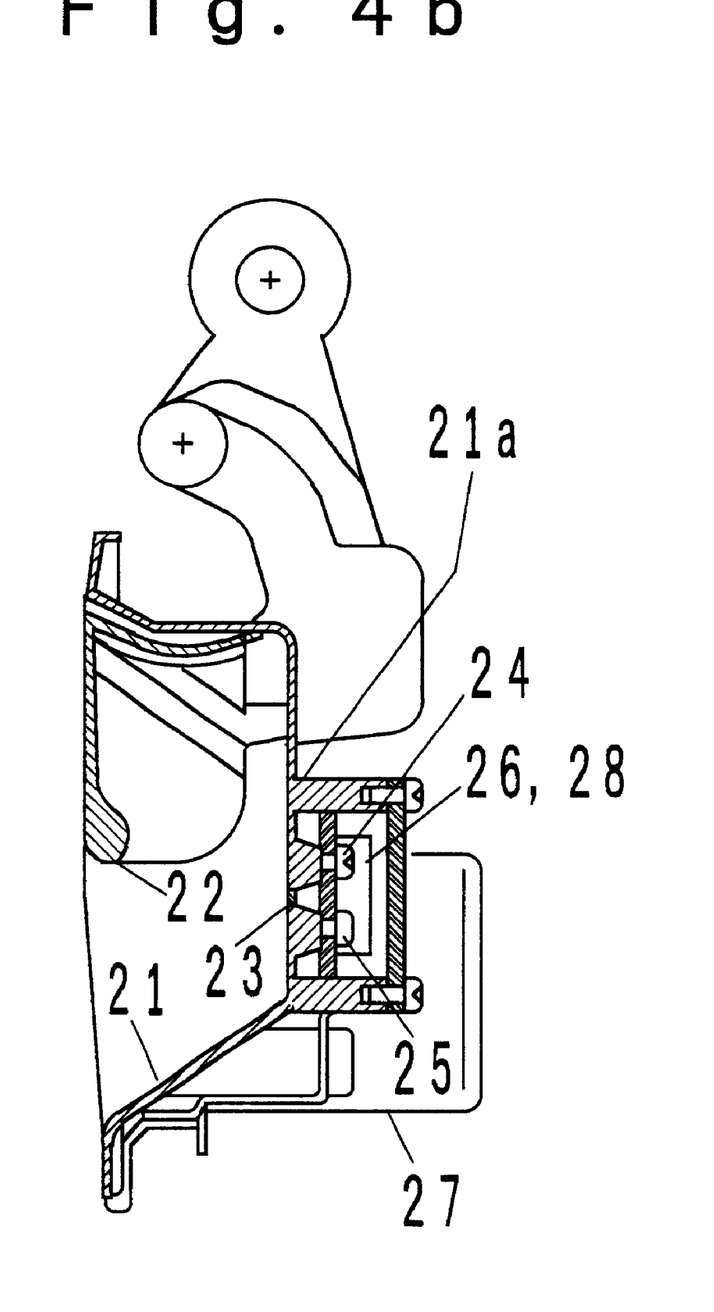

The structure of the antenna 23 will now be described with reference to FIGS. 4a and 4b. An outside handle (hereinafter referred to as a "door handle") 20 is provided on a driver-side door of the vehicle. The door handle 20 is formed of die cast zinc and its surface is coated with chromium plating. The door handle 20 is equipped with a key cylinder 27 and includes a base plate member 21 and a doorknob 22. A depression is formed on the outer side of the base plate member 21 in order to allow a driver to insert his/her hand into the door handle 20. The doorknob 22 can be turned relative to the base plate member 21 in a clockwise direction as viewed in FIG. 4b. A straight slit for the antenna 23 is cut in the bottom wall 21a of the base plate member 21. The slit is filled with a synthetic resin, such that the opening of the slit is closed by the synthetic resin. In the present embodiment, the slit assumes the form of a straight line; however, the shape of the slit is not limited thereto.

Two seating bases 23 are provided on the bottom wall 21a, and threaded holes are formed in the seating bases 23. Screws 24 and 25 are screwed into the threaded holes, and an output-side terminal of the balun 28 is integrally connected to the screws 24 and 25. One end of a coaxial cable (feed line) is connected to the input-side terminal of the balun 28. The other end of the coaxial cable is connected to the transmission circuit 26. The slit provided in the door handle 20 serves as the antenna 23 that transmits a request signal to the portable unit 10. That is, the object sensor 1 functions as a transmitter for transmitting the request signal. The doorknob is not limited to a pull-up type door handle (a door handle that swings in the vertical direction) as shown in FIG. 4b, and may assume the form of a grip-type door handle (a door handle that swings in the widthwise direction of the vehicle).

Figure 5:
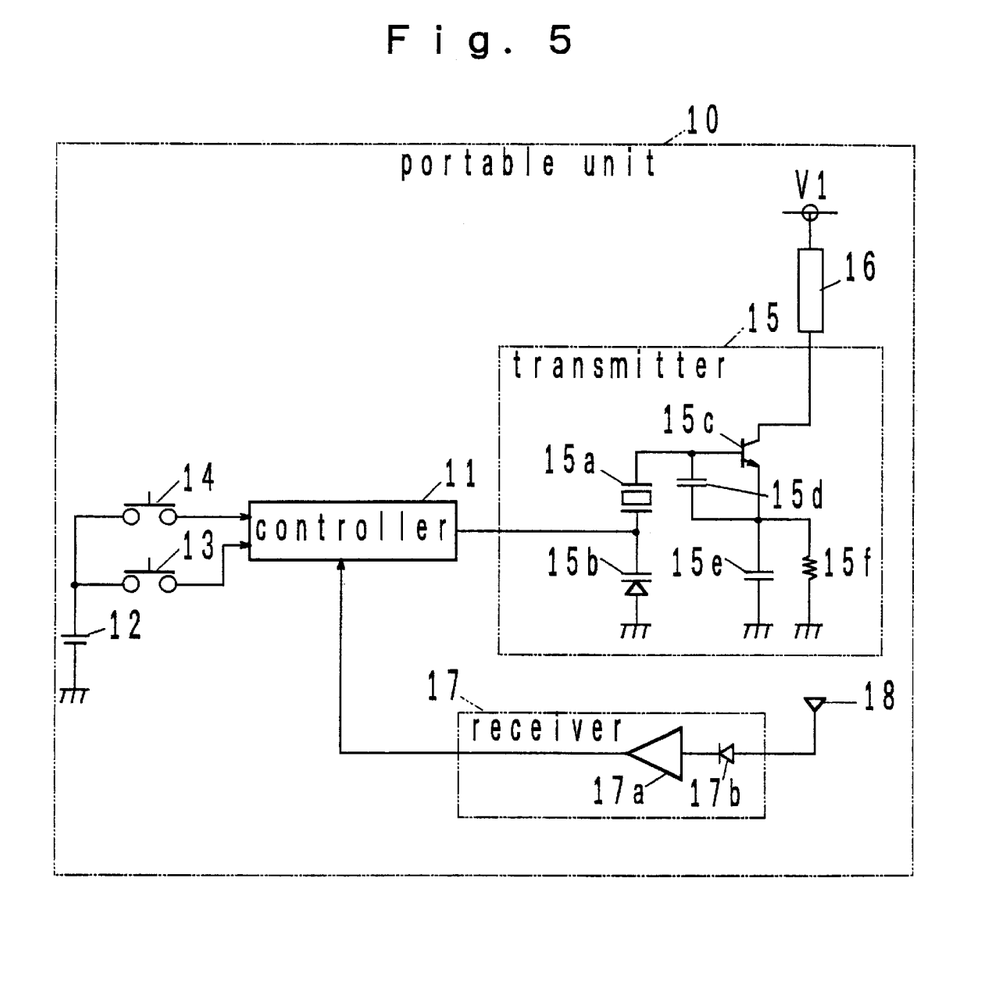
FIG. 5 is an electrical circuit diagram showing the structure of the portable unit shown in FIG. 1.

The circuit configuration of the portable unit 10 will now be described with reference to FIG. 5. A signal received by an antenna 18 is detected and amplified by a receiver 17 serving as a detector and is then input to the controller 11. The output of an amplifier 17a of the receiver 17 attains a high level H when a reception signal is detected, and attains a low level L when no reception signal is detected. A lock switch 14 and an unlock switch 13 are normal-open switches. When a driver depresses the lock switch 14 or the unlock switch 13, the lock switch 14 or the unlock switch 13 supplies to the controller 11 a high level signal from a DC power supply 12.

When the controller 11 receives a high-level trigger signal from the amplifier 17a, the lock switch 14, or the unlock switch 13, the controller 11 serially reads out an ID code stored in an internal register and serially outputs the ID code to the transmitter 15 while adding bits $K_0$–$K_2$ thereto.

The controller 11 sets bit $K_0$ to 1 (H) when a high level trigger is output from the amplifier 17a, sets bit $K_2$ to 1 when a high level trigger is output from the lock switch 14, and sets bit $K_1$ to 1 when a high level trigger is output from the unlock switch 13.

The ID code is data that identifies the portable unit 10, and the same ID code is stored in the controller 31 of the control apparatus 30.

The output of the controller 11 is supplied to a resonator element 15a and a variable capacitance diode 15b, and is applied to the base of a transistor 15c via the resonator element 15a. Therefore, the capacitance of the variable capacitance diode 15b changes depending on whether each bit of the ID code assumes the value 1 (H) or 0 (L). The emitter of the transistor 15c is grounded via a capacitor 15e and a resistor 15f. The collector of the transistor 15c is connected to one end of a communications antenna 16. A capacitor 15d is connected between the base and the emitter of the transistor 15c.

The transistor 15c is in an ON state regardless of whether each bit of the ID code is 1 (H) or 0 (L). The load capacitance of the resonator element 15a changes depending on the level of each bit of the ID code, and the oscillation frequency of the transmitter 15 changes in accordance with the change in the load capacitance. Thus, a wave that has been frequency-modulated in accordance with the ID code is transmitted from the antenna 16.

Figure 6A:
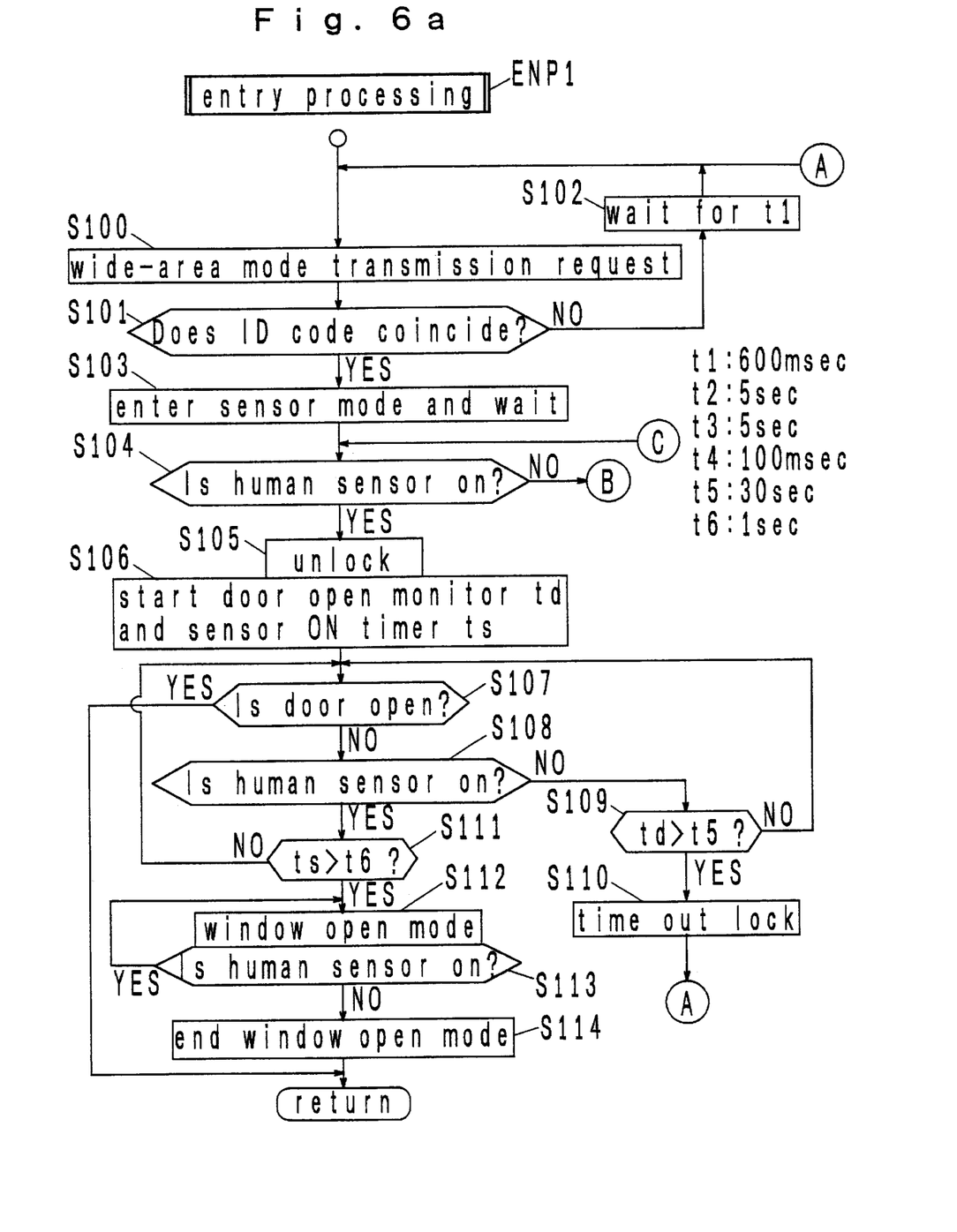
FIGS. 6a and 6b are flowcharts showing an "entry process" ENP1 that is performed by a controller shown in FIG. 1 in order to unlock the driver-side door or open the window in response to approach of a driver carrying the portable unit.
Figure 6B:
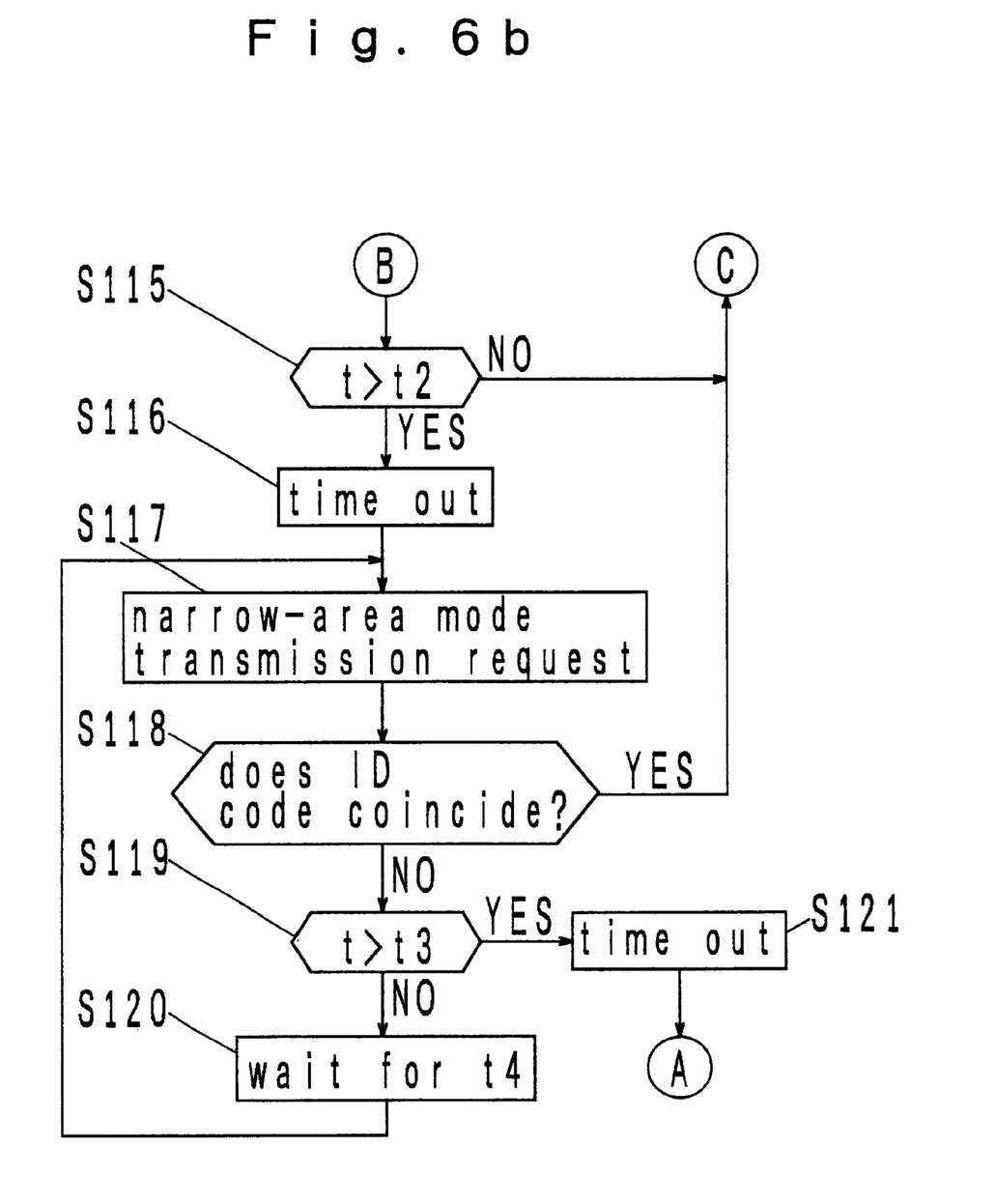

FIGS. 6a and 6b show the details of an "entry processing" ENP1 performed by the controller 31 of the control apparatus 30. The entry processing ENP1 is performed when the driver-side door is locked while the vehicle is in a parked state.

Referring to FIG. 6a, in step S100, the controller 31 outputs a high-power transmission command to the transmission circuit 26 to thereby transmit request data (a transmission request signal). Subsequently, the controller 31 waits until the receiver 33 receives a reply signal. Upon receipt of the reply signal, the controller 31 checks whether an ID code represented by the received reply signal coincides with an ID code stored in the controller 31. When no signal is received within a predetermined period, or when the received ID code does not coincide with the stored ID code, the controller 31 transmits request data again after awaiting passage of a time period t1 (steps S101 and S102). In the present embodiment, t1=600 msec.

When the ID code represented by the received reply signal coincides with the ID code stored in the controller 31, the controller 31 enters a human sensor mode or an object-approach monitor mode, in which the controller 31 waits, while measuring a wait time t, until the output signal SEN of the sensing circuit 2 becomes H to indicate detection of, for example, a hand present in front of the slit 23 of the door handle (S103 and S104).

When the output signal SEN of the sensing circuit 2 becomes H (when the sensing circuit 2 has sensed an object), in step S105, the controller 31 brings to an L level the unlock signal line of the door lock control switch 43. That is, the controller 31 unlocks the door.

After unlocking the door, in step S106, the controller 31 starts timers which measure passage of time td and passage of time ts, and waits until the door is opened (step S107). When the door is opened, the entry processing ENP1 is ended, and the controller 31 returns to an unillustrated main routine. subsequently, the controller 31 waits until the door is closed (until the driver enters the vehicle and closes the door). Subsequently, the controller 31 further waits until the ignition switch 51 is opened (the engine is stopped), the door is opened (the driver exits the vehicle), and the door is then closed (the door is closed by the driver who has exited the vehicle). After the wait operation, the controller 31 starts an "exit processing" for closing the window and locking the door. In the exit processing, when the window of the driver-side door is in an opened state, the controller 31 closes the window, and outputs a low-power transmission command to the transmission circuit 26 at predetermined intervals to thereby transmit request data (transmission request signal). During a period in which a response (ID code) corresponding the request data is received, the controller 31 repeats the transmission of the low-power transmission command, and locks the door when the transmission is performed a predetermined number of times after receipt of the response becomes impossible. Subsequently, the controller 31 returns to the main routine. Since the vehicle is in a parked state and the door is in a locked state, the controller 31 starts the entry processing ENP1.

When it is determined in step S107 of the entry processing ENP1 that the door is not opened, the controller 31 judges in step S108 whether the output signal SEN of the sensing circuit 2 is H (whether an object is sensed or a hand is present between the door knob 22 and the base plate member 21). If no hand is present (SEN=L) and the clocked time td exceeds t5 (30 sect, the controller 31 judges that the driver has no intention to open the door, and locks the door (steps S108–S110). Subsequently, the controller 31 returns to step S100. When a hand is detected before the clocked time td reaches t5 (30 sec), the controller 31 judges the clocked time ts to be greater than t6 (1 sec). If the clocked time ts is equal to or less than t6 (1 sec), it is highly probable that the driver wishes to open the door, and the controller 31 waits until the door is opened. However, when the clocked time ts exceeds t6, the controller 31 starts a drive for opening the window, and continues the drive for opening the window until the window is fully opened (steps S111–S114). This operation enables the window to be opened when the driver touches the door handle for the predetermined period t6 after detection of coincidence between the received ID code and the stored ID code. Thus, a special switch or the like becomes unnecessary.

As shown in FIG. 6b, during a predetermined period t2 after detection of ID code coincidence, the controller 31 checks (in step S115) whether the output signal SEN of the sensing circuit 2 is H (whether a hand is sensed). When no hand is detected within the period t2, the controller 31 outputs a low-power transmission command to the transmission circuit 26 in order to transmit request data (transmission request signal). Subsequently, the controller 31 waits until the receiver 33 receives a reply signal. Upon receipt of the reply signal, the controller 31 checks whether an ID code represented by the received reply signal coincides with the ID code stored in the controller 31. When no signal is received within a predetermined period, or when the received ID code does not coincide with the stored ID code, the controller 31 transmits request data again after awaiting passage of time t4 (100 msec) (steps S117–S120). When no ID code is received even after the transmission of the low-power transmission command is repeated for t3 (5 sec), the controller 31 returns to step S100.

Figure 8:
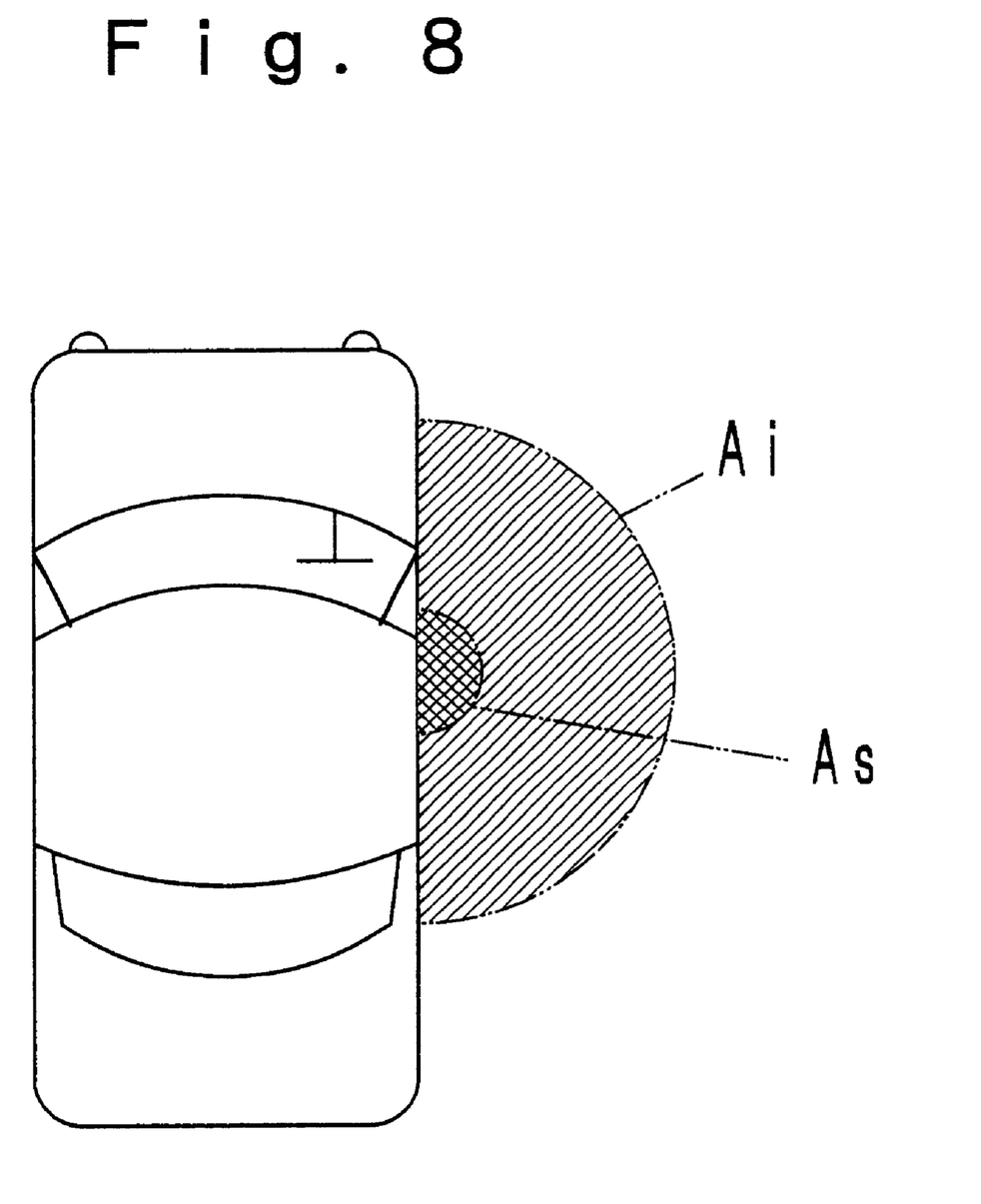
FIG. 8 is a plan view showing a communicable area Al of the antenna shown in FIG. 1 at the time of high output power, and a communicable area As of the antenna at the time of low output power.

FIG. 8 shows an area within which the above-described request data (transmission request signal) are transmitted. When a high-power transmission command (request data) is transmitted, the portable unit 10 can receive the request data (transmission request signal) if the portable unit 10 is located within a wider area Ai. By contrast, when a low-power transmission command is transmitted, the portable unit 10 can receive the request data only when the portable unit 10 is located within a narrower area As.

Transmission in a wide area mode or transmission of the high-power transmission command is performed at intervals t1 (600 msec). Transmission in a narrow area mode or transmission of the low-power transmission command is performed at intervals t4 (100 msec). Therefore, the interval t4 is one-sixth of the interval t1.

When no hand is sensed within the predetermined period t2 (5 sec) after detection of coincidence between the stored ID code and a response ID code transmitted in response to the high-power transmission command, the transmission power is reduced, and coincidence of the ID codes is checked again. Therefore, the consumed power is reduced.

Figure 7A:
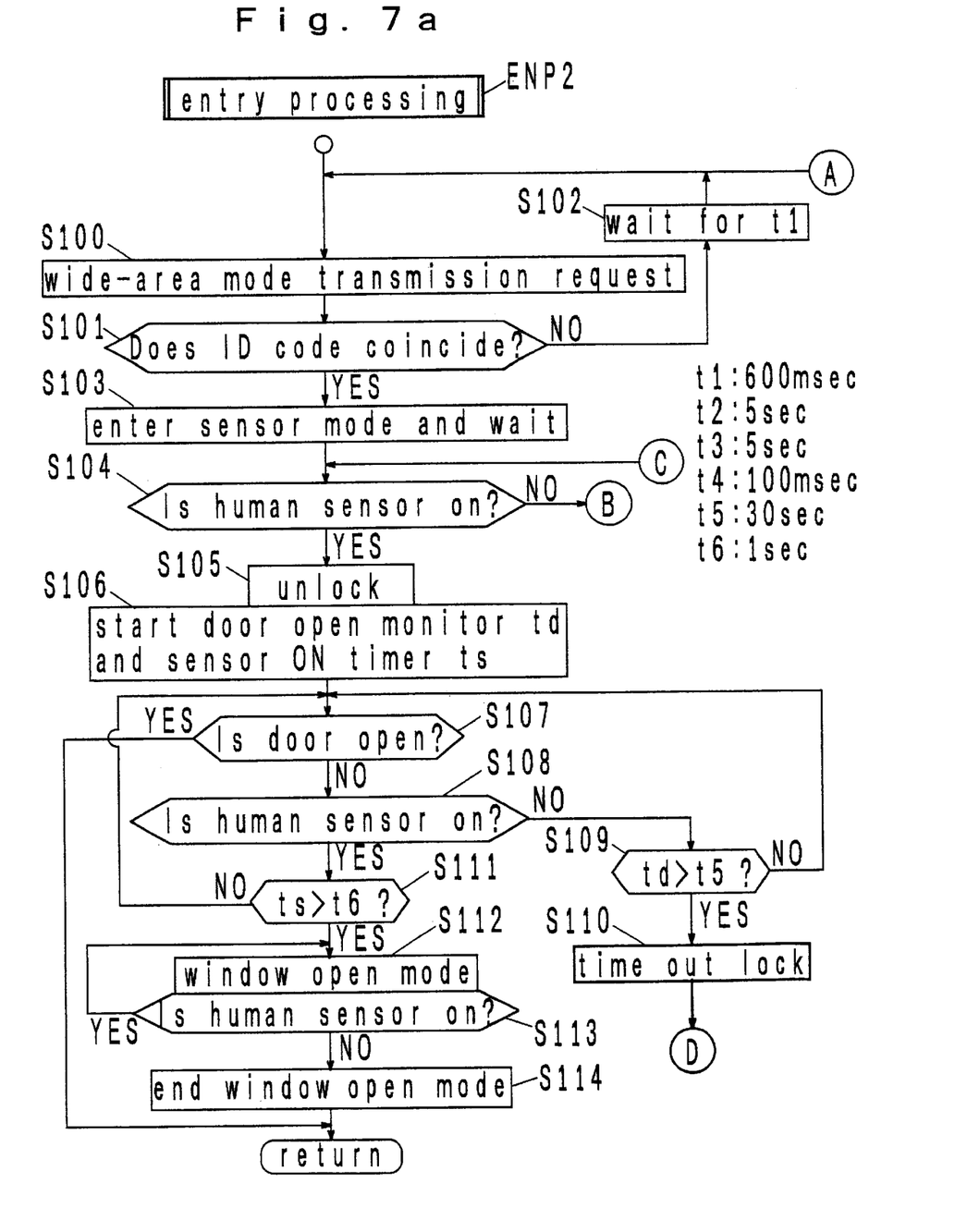
FIGS. 7a and 7b are flowcharts showing an "entry process" ENP2 that is performed by a controller according to another embodiment of the present invention.
Figure 7B:
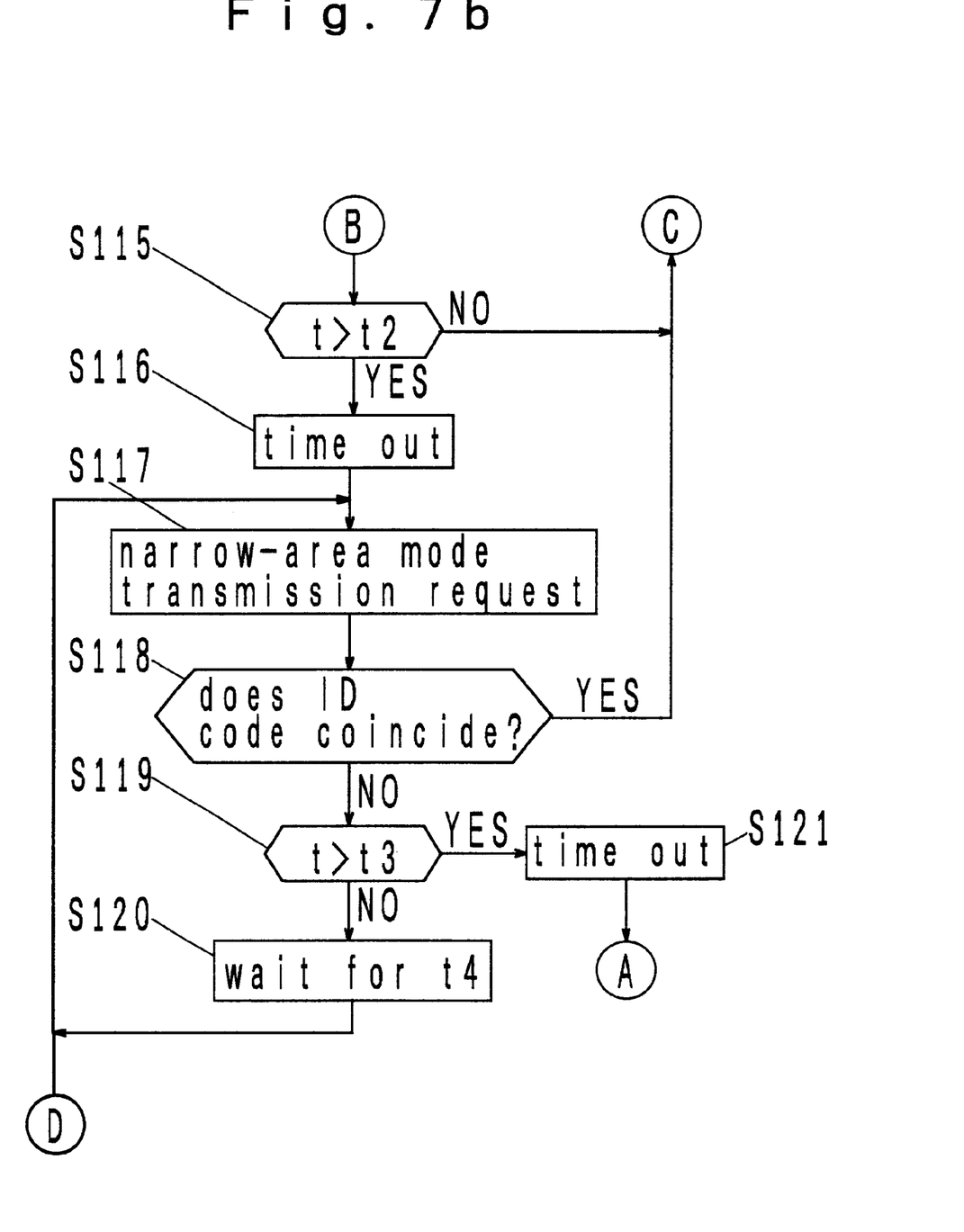

FIGS. 7a and 7b shows the details of "entry processing" ENP2 performed by the controller 31 according to another embodiment of the present invention. In the present embodiment, after locking the door in step S110, the controller 31 proceeds to a narrow area mode in step S117. When the time period t5 has elapsed without the door being opened and a hand becomes undetectable after initial detection of ID code coincidence and presence of the hand, the controller proceeds to step S117 and transmits a low-power transmission command. Thus, consumed power is decreased as in the above-described case.

While preferred embodiments of the invention have been shown and described above, a number of changes and modifications are possible. Accordingly, the invention is not intended to be limited to the specific constitution or arrangement disclosed herein, but the right is reserved to all changes and modifications coming within the scope of invention defined by the appended claims.

What is claimed is:

1. A remote control apparatus comprising:
   a transmitter for transmitting a transmission request signal;
   a receiver for receiving a reply signal transmitted in response to the transmission request signal;
   operation control means for controlling an operation state of an equipment depending on whether said receiver receives the reply signal;
   a portable unit for receiving the transmission request signal and for transmitting the reply signal to the receiver in response to receiving the transmission request signal from the transmitter;
   an object sensor for sensing an approach of an object;
   transmission power control means connected to said transmitter, said object sensor and said receiver for reducing the transmission power of the transmission request signal from said transmitter when said object sensor senses no object and said receiver receives the reply signal from said portable unit.

2. A remote control apparatus according to claim 1, wherein said transmission power control means causes said transmitter to transmit a transmission request signal at predetermined interval t1 when said receiver receives no reply signal and suppresses transmission of the transmission request signal when said receiver receives a reply signal.

3. A remote control apparatus according to claim 2, wherein said suppression of transmission of the transmission request signal is stoppage of said transmission of the transmission request signal.

4. A remote control apparatus according to claim 3, wherein said transmission power control means, after said stoppage of said transmission of the transmission request signal, subsequently waits up to a predetermined period t2 until said object sensor detects an object, and causes a second time said transmitter to transmit the transmission request signal when said predetermined period t2 has elapsed during which said object sensor senses no object.

5. A remote control apparatus according to claim 3, wherein power of said transmission of the transmission request signal of said second time is less than that of said transmission of the transmission request signal of said predetermined interval t1.

6. A remote control apparatus according to claim 1, wherein said equipment includes a door lock/unlock mechanism, and said operation control means drives said door lock/unlock mechanism for unlocking operation, when a reply signal received by said receiver represents a predetermined identification code and said object sensor detects an object.

7. A remote control apparatus according to claim 6, wherein said remote control apparatus further comprises an open/close sensor for generating a signal indicating an open/close state of the door; said equipment includes a door window drive mechanism; and said operation control means causes said door window drive mechanism to open a door window when, after said door lock/unlock mechanism is driven for unlock operation, said object sensor continuously detects an object and said open/close sensor continuously outputs a door close signal for a predetermined period t6.

8. A remote control apparatus according to claim 6, wherein said operation control means drives said door lock/unlock mechanism for lock operation when, after said door lock/unlock mechanism is driven for unlocking operation, said object sensor does not detect an object and said open/close sensor continuously outputs a door close signal for a predetermined period t5.

9. A remote control apparatus according to claim 1, wherein said object sensor comprises a slot antenna having an outside door handle, at least the surface of which is formed of a conductive material, a slit formed in said conductive material, and feeding points provided on said conductive material; and said transmitter supplies said feeding points with a radio wave transmission voltage.

10. A remote control apparatus according to claim 1, wherein said transmitter comprises changeover means for changing the transmission output between a high-power output and a low-power output.

* * * * *